（12）United States Patent
Taylor et al.

(10) Patent No.: US 9,196,239 B1
(45) Date of Patent: Nov. 24, 2015

(54) DISTRACTED BROWSING MODES

(71) Applicant: Amazon Technologies, Inc., Reno, NV (US)

(72) Inventors: Brett Richard Taylor, Bainbridge Island, WA (US); Charley Ames, Seattle, WA (US); Matthew Lloyd Trahan, Seattle, WA (US); Dennis Pilarinos, Vancouver (CA)

(73) Assignee: Amazon Technologies, Inc., Reno, NV (US)

( * ) Notice: Subject to any disclaimer, the term of this patent is extended or adjusted under 35 U.S.C. 154(b) by 267 days.

(21) Appl. No.: 14/015,692

(22) Filed: Aug. 30, 2013

(51) Int. Cl.
*G10L 13/00* (2006.01)

(52) U.S. Cl.
CPC ...................................... *G10L 13/00* (2013.01)

(58) Field of Classification Search
CPC ........................................................ G10L 13/00
USPC ........................................................ 704/275
See application file for complete search history.

(56) References Cited

U.S. PATENT DOCUMENTS

| 7,073,129 | B1* | 7/2006 | Robarts et al. | 715/740 |
|---|---|---|---|---|
| 7,395,507 | B2* | 7/2008 | Robarts et al. | 715/744 |
| 7,762,665 | B2* | 7/2010 | Vertegaal et al. | 351/209 |
| 8,096,660 | B2* | 1/2012 | Vertegaal et al. | 351/209 |
| 8,292,433 | B2* | 10/2012 | Vertegaal | 351/209 |
| 8,322,856 | B2* | 12/2012 | Vertegaal et al. | 351/209 |
| 8,672,482 | B2* | 3/2014 | Vertegaal et al. | 351/209 |

* cited by examiner

*Primary Examiner* — Susan McFadden
(74) *Attorney, Agent, or Firm* — Hogan Lovells US LLP

(57) ABSTRACT

Approaches to enable a computing device, such as a phone or tablet computer, to determine when a user viewing the content is being distracted or is generally viewing the content with a sufficient level of irregularity, and present an audible representation of the content during the times when the user is deemed distracted. The determination of when the user is distracted or is otherwise viewing the content with irregularity can be performed using sensor data captured by one or more sensors of the computing device. For example, the computing device may analyze the image data captured by one or more cameras, such as by tracking the movement/location of eye pupils of the user and/or tracking the head movement of the user to detect when the user is distracted.

23 Claims, 8 Drawing Sheets

DISTRACTED BROWSING MODES

BACKGROUND

Recent years have seen drastic increases in the use of portable computing devices, such as smart phones and tablet computers. Today's consumers are utilizing such devices for a wide variety of different purposes, such as to browse content, access and search the Internet, purchase products and services, capture and/or send digital images, compose electronic mail (email) messages, make telephone calls and the like. Due to the portability of modern devices, the user is usually able to hold a device while simultaneously walking, watching television or performing other tasks that may intermittently require the user's attention. In many situations it is inconvenient for the user to attempt to browse content displayed on a display screen of the device while at the same time performing another task. For example, walking and trying to read the contents of a web page displayed on a mobile phone is not only difficult but sometimes dangerous for the user, especially in busy street intersections and other public locations.

BRIEF DESCRIPTION OF THE DRAWINGS

Various embodiments in accordance with the present disclosure will be described with reference to the drawings, in which.

DETAILED DESCRIPTION

Figure 1:
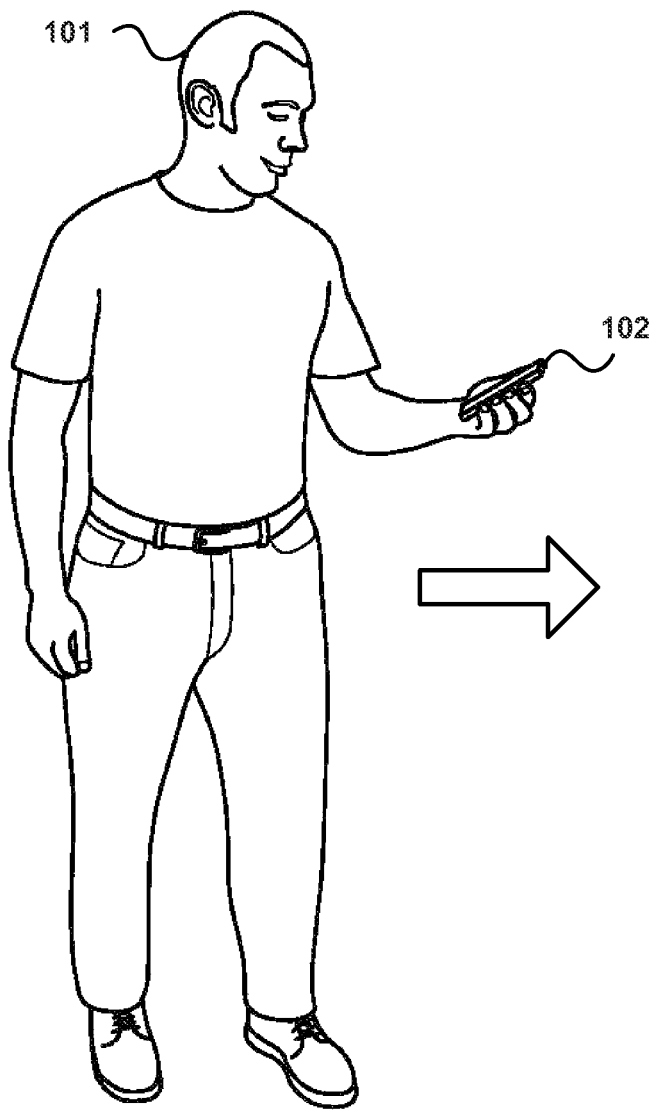
FIG. 1 illustrates an example of a computing device being used in the context of augmented reality image processing, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for viewing or browsing content using computing devices. In particular, various approaches discussed herein enable a computing device, such as a phone or tablet computer, to determine when a user viewing the content is being distracted or is generally viewing the content with a sufficient level of irregularity, and present an audible representation of the content during the times when the user is deemed distracted. The determination of when the user is distracted or is otherwise viewing the content with irregularity can be performed using sensor data captured by one or more sensors of the computing device. For example, the computing device may analyze the image data captured by one or more cameras, such as by tracking the movement/location of eye pupils of the user and/or tracking the head movement of the user to detect when the user is distracted (e.g., the user keeps looking away from the screen for more than a threshold number of times or for longer than a threshold amount of time). During the time periods when the user is distracted, the computing device may render the audible representation of the content, such as by converting the portions of a web page intended for display to the user into audio (e.g., performing text-to-speech conversion) and playing the audio to the user using an audio output device (e.g., speaker). When the computing device detects that the user is no longer distracted (or no longer viewing the content with irregularity), the device may discontinue the rendering of audible representation of the content.

In some embodiments, as the user continues to switch back and forth between distracted mode and non-distracted mode, the device may continue to scroll the content displayed on the page. For example, when the user starts to look back at the display screen, the device may scroll the page down to the last portion of the content that was being rendered in audible format so that the user may continue reading the content from that point forward.

In some embodiments, while the computing device is playing the audio content, the device may activate one or more voice commands to enable the user to navigate the content. When the user issues the voice commands, the device may suspend the rendering of the audible content and invoke one or more functions associated with the voice commands. For example, a voice command may instruct the device to load the next page of content, access a link over a network, or the like.

FIG. 1 illustrates an example of a user holding a computing device while walking, in accordance with various embodiments. In this illustration, the computing device 102 is shown to be a mobile phone, however, in various alternative embodiments, the computing device may be a tablet computer, an electronic reader (e-reader) device, a digital music player, a laptop, a personal digital assistants (PDA), a personal computers (PC), a wearable computing device, such as virtual glasses, a smart watch, or the like. As shown in the illustration, the user 101 may hold the computing device 102 while walking or performing other tasks that may require the user's partial attention. Consequently, the user may be attempting to view content being displayed on the screen intermittently by repeatedly looking up and/or away from the screen of the device. In various embodiments, the computing device 102 can detect such distracted browsing by observing frequent head movement or eye movement, implying that perhaps the user 101 is driving or walking down a busy street. If the computing device 102 determines that the user is likely to be distracted, the computing device 102 may convert the content being displayed on the screen into an audible representation and begin to render the audible representation using an audio output device, such as a speaker, embedded in the computing device 102.

As used herein, the term "content" is intended to be broadly construed to include any type of information, images or multimedia that is capable of being presented to the user. For example, in some embodiments, content is one or more web pages rendered by a web browser operating on the computing device. The web pages may include text, images and links to other content. In other embodiments, content may be the text of a book or other article, such as may be displayed on an e-reader device. In any event, this disclosure is not limited to any particular type of content and any content that is capable of being presented to the user can be utilized within the scope of the various embodiments.

Figure 2A:
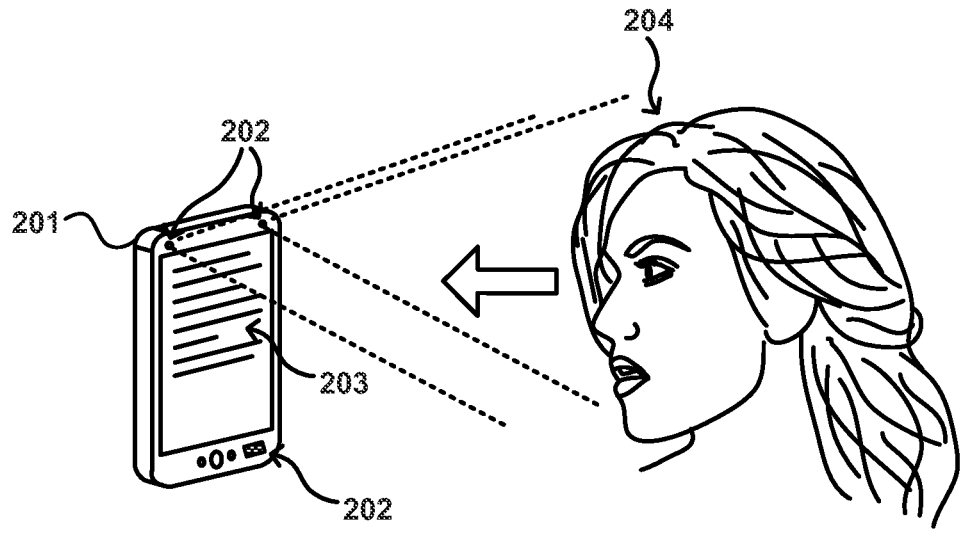
FIGS. 2A-2B illustrate examples of a computing device that is detecting when the user is distracted in viewing the content, in accordance with various embodiments.
Figure 2B:
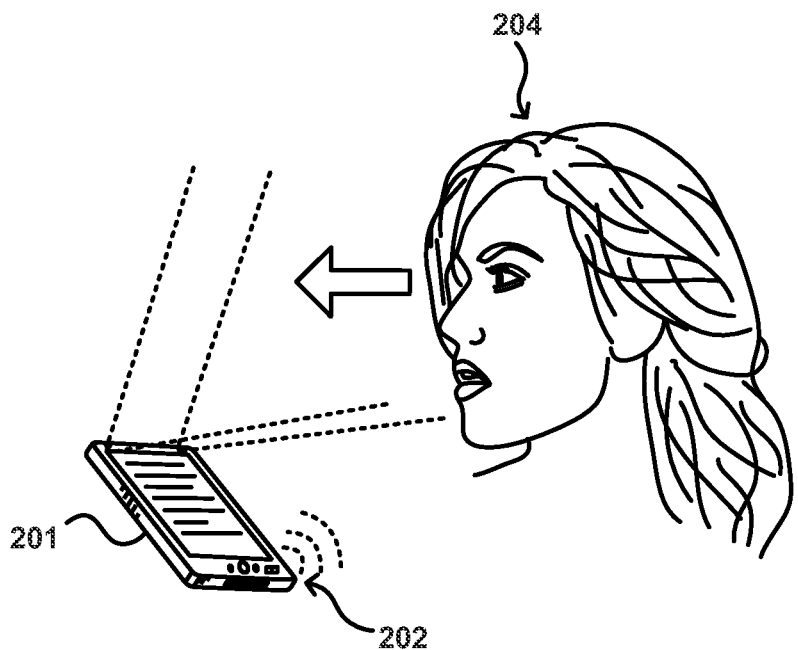

FIGS. 2A and 2B illustrate an example of a computing device that is detecting when the user is distracted in viewing the content, in accordance with various embodiments. As shown in FIG. 2A, the computing device 201 may utilize its sensor data to detect whether the user 204 is viewing the content being displayed on the display screen 203. In particular, the computing device 201 may include one or more front-facing cameras 202 that may capture image data of the user's face, eyes and/or other features. For example, the computing device 201 may analyze the image data being captured by the cameras 202 in order to track the gaze direction of the user 204 over time and detect when the user 204 is distracted in viewing the content displayed on the screen or is otherwise viewing the content with a sufficient level of irregularity. For example, the computing device 201 may keep track of the number of times that the user 204 looks away from the display screen over some measured time interval and determine that the user is likely to be distracted if the user looks away from the screen for more than a threshold number of times over that interval. Alternatively, the computing device may keep track of a percentage of time that the user is looking at the display screen over the measured time interval and determine that the user is likely to be distracted when the user has looked away from the screen for more than a threshold percentage of time. In various embodiments, the computing device may utilize any machine learning or other algorithmic computation based on input data received from the cameras, as well as other sensors (e.g., gyroscope, accelerometer, GPS, light sensors, etc.), to predict when the user is likely to be distracted. In general, it would be undesirable for the computing device to begin playing the audible version every time the user glances away, and as such, a more sophisticated algorithm (e.g., machine learning, etc.) can be implemented that measures the overall extent of the user looking away from the screen to determine that the probability of the user being distracted is high enough (e.g., higher than some defined threshold).

In addition (or alternatively) to the cameras, data captured by other sensors of the computing device 201 may be utilized in the computation to determine when the user is likely to be distracted. The sensors may include but are not limited to a gyroscope that can capture orientation data, an accelerometer that is capable of measuring the acceleration of the device, a global positioning system (GPS) receiver that provides location data of the device, one or more light sensors that provider information about the amount of ambient light in the environment, and the like. For example, the computing device 201 can analyze its location provided by the GPS receiver in combination with the image data obtained from the cameras and determine that the user is repeatedly glancing up and away from the display screen while the device is moving on a major public street. Based on this information, the computing device may conclude that the user is likely to be walking or driving and therefore be distracted in viewing the content.

Once the computing device 201 detects that the user is likely to be distracted or viewing the content with a sufficient level of irregularity, the computing device may present an audible representation of the content to the user by using one or more audio output devices, such as the speaker 202. FIG. 2B illustrates an example of the device 201 playing the audible representation of content. In some embodiments, the computing device may first convert the content into a form suitable to be rendered on the audio output device. For example, the computing device may perform data scraping on the contents of a web page displayed by a web browser to select the portions of the content that are intended to be for display to the user. The device may then convert the selected portions of the content into the audible speech representation of those portions (e.g., text-to-speech conversion) and play the speech representation to the user using one or more speakers 202. Alternatively, in embodiments where an audio file is available for the content, the computing device 201 may retrieve the audio file associated with the content and render the audio file the speakers 202. In some embodiments, the provider of the content (e.g., web site owner, book publisher, etc.) can provide such audio to be used in conjunction with the content. Alternatively, the audio file may be provided by a backend service that generates the audio files for the most popular webpages and streams the audio file to the device, such as during the times when the device determines that its user is distracted.

As the device continues to render the audible representation of the content, the device may also continue to scroll the content being displayed on the screen, so that if the user looks back at the screen, he or she may view the visual representation of the content being rendered by the device.

In some embodiments, when the device detects that the user is likely to be distracted, the user may also perform one or more power saving functions in addition to (or instead of) rendering the audible version of the content. For example, the device may dim or turn off the display screen, turn off a wireless signal, suspend certain computations, or perform other power saving functions during the time periods when the user is distracted. In other embodiments, the device may perform other actions unrelated to power savings when the user is likely to be distracted, such as delaying the display of new advertisements on the screen (on the assumption that the user has not seen the currently displayed advertisement) and the like.

In some embodiments, the computing device 201 may activate one or more voice commands to allow the user to control the navigation of the content, or invoke other functions of the device. For example, the user may speak voice commands such as "go to next page" or "access content at link ABC" and the computing device may detect the commands using one or more sound detection components (e.g., microphones) and interpret the voice commands (e.g., such as by using speech recognition). In some embodiments, the computing device may immediately suspend the rendering of the audible representation of content when the computing device detects the one or more voice commands and invoke the function associated with the voice command. For example, during the rendering of the audio, the device may intelligently read links (e.g., indicating the location of the link on the page, etc.) and allow the user to select the various links by using speech commands. In some embodiments, the voice commands may include instructions to cause the device to save the audible representation into an audio library of the user. For example, if the content of a web page is being read out loud to the user, the user may instruct the device to save the audio file of that content in the user's audio library.

In some embodiments, as the computing device 201 continues rendering the audible version of the content, the computing device may continue monitoring the user's features, as before, such as by utilizing the cameras, accelerometer, gyroscope, GPS and the like. In some embodiments, if the computing device detects that the user is no longer distracted, or is viewing the content with a sufficient level of regularity, the computing device may discontinue rendering the audible version of the content. For example, if the computing device detects that the pupils of the user have been viewing the content continuously over a specified minimum time interval, the computing device may cease playing the audible representation of the content. In some embodiments, upon discontinuing the audio, the computing device may automatically scroll to the portion of the page where the computing device was reading the content at the time of discontinuing the audio and/or highlight the portion of the page containing that portion of content.

In some embodiments, the detection of distracted browsing may be configured on the computing device. For example, the operating system, application or web browser of the computing device may provide an interface for enabling detection of distracted browsing and audio playback of audible version of content. In some embodiments, there may also be a parental control mode that is configurable by the user, such as where a parent is able to configure the settings to always use distracted mode for certain users (e g, minors) and to not allow those users to disable the distracted mode.

Figure 3A:
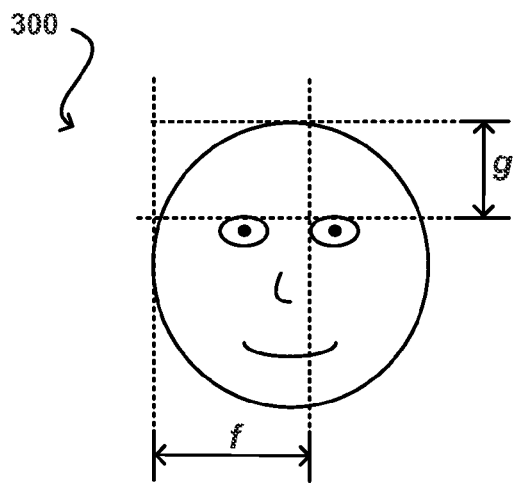
FIGS. 3A-3C illustrate examples wherein images are captured and analyzed to determine the relative positions of the user's head and the user's eyes, in accordance with various embodiments.
Figure 3A:
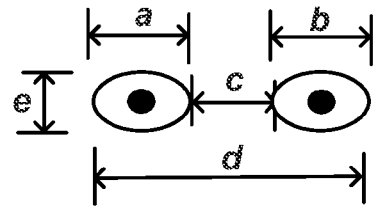
Figure 3B:
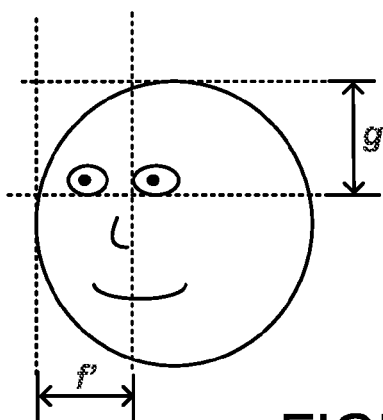
Figure 3B:
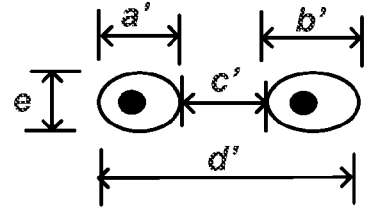
Figure 3C:
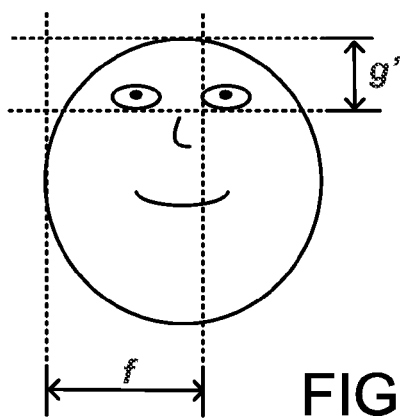
Figure 3C:
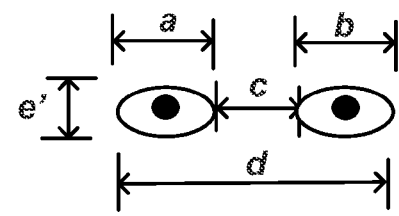

As previously described, in various embodiments, the computing device is able to utilize head tracking, eye tracking and gaze information to determine when the user is likely to be distracted. In order to determine the gaze direction of a user for such a process, the device in at least some embodiments has to determine the relative position of the user (or the user's features) relative to the device, as well as dimensions or other aspects of the user at that position. FIG. 3A illustrates an example 300 wherein images are captured and analyzed to determine the relative positions of the user's head and the user's eyes. In a system wherein the algorithm is able to differentiate the user's pupils, the system can also utilize the relative position of the pupils with respect to the eye position. For example, FIG. 3B illustrates a case where the user is looking "left" (or to the user's right"), such that a center point of each user's pupil is to the left (in the image) of the center point of the respective eye. Similarly, FIG. 3C illustrates a case where the user is looking "up". As can be seen, the positions of the pupils have moved above a center point of the eyes. The position of the pupils can change without the user moving his or her head. Thus the system may be able to, in some embodiments, detect a glance without a change in head position. A system in accordance with one embodiment can take advantage of such information by determining when the user is being distracted in viewing the content according to the detected position of the user's pupils relative to the user's eyes, and thus the determined area at which the user is looking. A system can also detect movements such as a user closing his or her eyes for an extended period of time, wherein the device can perform an action such as rendering the audible version of the content. A system in some embodiments can differentiate between different types of movement, such as between eye tremor, smooth tracking, and ballistic movements.

In one embodiment, a user may calibrate a device by looking at each of a number of targets on a screen, such as at each corner, whereby the device can detect relative positions of the pupils to the eyes of the user for different locations on the display. Thus, when a user looks to a certain portion of the display, the device can act accordingly. For example, if a user is reading content displayed on an electronic reader (e-reader) device, the device can track whether the user is viewing the content regularly or whether the user is being distracted.

Figure 4A:
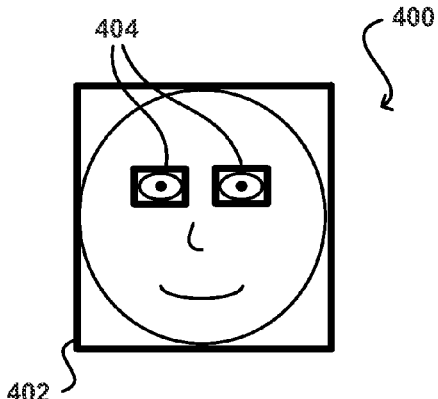
FIGS. 4A-4F illustrate examples of analyzing an image to determine the approximate location and size of a user's head or face, in accordance with various embodiments.

Various approaches can be utilized for locating one or more desired features of a user's face to determine various aspects useful for determining relative orientation. For example, if a user's head is to be used as input, there can be many objects that can be shaped similar to a human head that could give false readings. Accordingly, various approaches utilize features such as a user's eyes to assist in position and movement determination. For example, an image can be analyzed to determine the approximate location and size of a user's head or face. FIG. 4A illustrates an example wherein the approximate position and area of a user's head or face 400 is determined and a virtual "box" 402 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 404 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth.

Figure 4B:
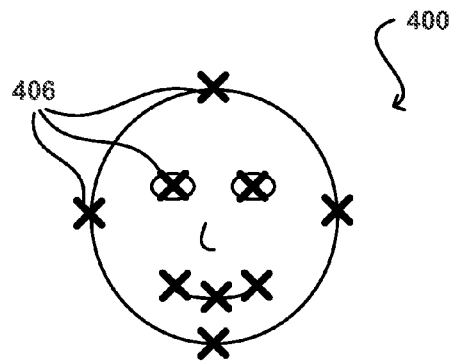

Various other algorithms can be used to determine the location of features on a user's face. For example, FIG. 4B illustrates an example wherein various features on a user's face are identified and assigned a point location 406 in the image. The system thus can detect various aspects of user features and can determine changes such as movement or change in shape or expression. Such an approach provides advantages over the general approach of FIG. 4A in certain situations, as various points along a feature can be determined, such as the end points and at least one center point of a user's mouth. Accordingly, expressions such as a smile or frown can be captured even though the overall position of the user's mouth or face did not move.

Figure 4C:
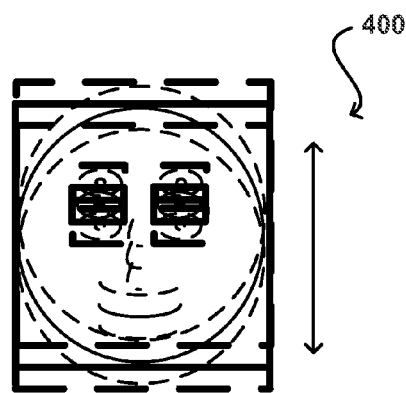
Figure 4D:
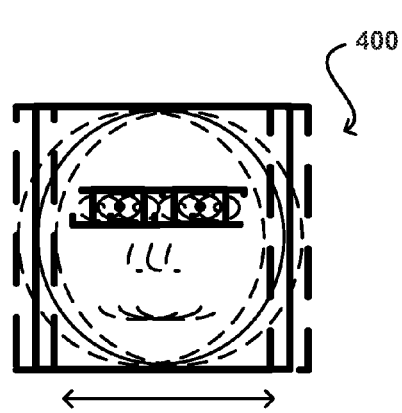
Figure 4E:
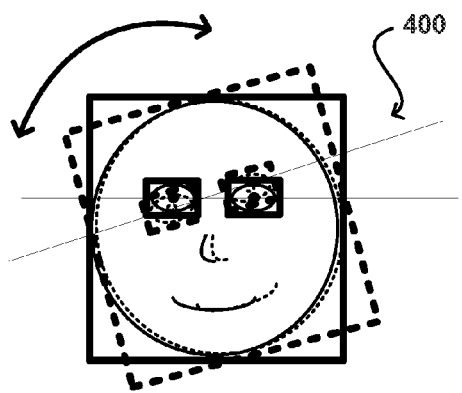

Once the positions of facial features of a user are identified, relative motion between the user and the device can be detected and utilized as data to determine when the user is distracted. For example, FIG. 4C illustrates an example where the user's head 400 is moving up and down with respect to the viewable area of the imaging element. As discussed, this could be the result of the user shaking his or her head, the user looking up and away from the screen, or the user moving the device up and down, etc. FIG. 4D illustrates a similar example wherein the user is moving right to left relative to the device, through movement of the user, the device, or both. As can be seen, each movement can be tracked as a vertical or horizontal movement, respectively, and each can be treated as input to the algorithm for determining when the user is viewing the device with irregularity or is being distracted. As should be understood, such a process also can detect diagonal or other such movements. FIG. 4E further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input for the algorithm to determine a distracted user.

Figure 4F:
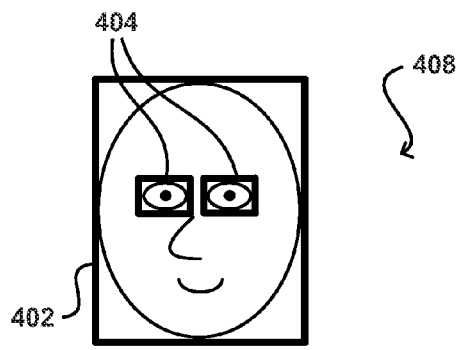

FIG. 4F illustrates another advantage of using an approach such as that described with respect to FIG. 4B to determine the position of various features on a user's face. In this exaggerated example, it can be seen that the features of a second user's head 408 have a different relative position and separation. Thus, the device also can not only determine positions of features for a user, but can distinguish between different users. As discussed later herein, this can allow the device to perform differently for inputs from different users. Also, the device can be configured to detect how close a user is to the device based on, for example, the amount and ratio of separation of various features, such that the device can detect movement towards, and away from, the device. This can help to improve the accuracy of gaze detection.

Further, although many embodiments are described with respect to facial features and/or head movements, it should be understood that a device can capture and analyze other types of movement useful for determining whether the user is being distracted or is otherwise viewing content with a level of irregularity. For example, device movement data captured by an accelerometer or a gyroscope may be used in combination with the head and eye movements determined from the image data to determine when the user is interrupted from viewing the content. Similarly, location data provided by a global positioning system (GPS) receiver may indicate that the device is in a moving car or traveling on a street, etc., which can be used by the device to determine that the user is likely to be in a distracted browsing mode.

In some embodiments, a computing device can determine and track an approximate area or region of interest corresponding to the user's eyes, or another such feature, in the captured images such that an algorithm of the computing device only has to analyze image data corresponding to that region, which can significantly reduce the amount of processing needed for images, particularly for high resolution, full color images.

In at least some embodiments, a device is able to distinguish between movement of the user and movement of the device, such as by detecting movement of a background or other aspect of the images, by analyzing the separation, shape or size of various features, or using movement sensing elements such as an accelerometer.

In some embodiments, a device can attempt to determine information about a glint or reflection of a user's eye in addition to pupil or iris information. In some embodiments where a high resolution camera enables precise determinations to be made, the center point of a glint and a pupil can be used to generate a three-dimensional model of the user's eye. A center of focus determination can be made using the model and the captured image information, enabling the device to accurately determine gaze direction based on the glint and pupil information. By maintaining such a model, the number of calibration points needed can be reduced. In one embodiment, four points near the center of a display may be sufficient, as opposed to points at the full width and length for other embodiments. The number and arrangement of calibration points can vary, depending at least in part upon the algorithm or technique used. In some embodiments, there are diminishing returns to adding additional points, as the accuracy of the calibration is not significantly improved for the amount of additional processing.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred. Certain existing cameras can detect infrared radiation, but typically utilize an IR filter. Utilizing these cameras without the IR filter and potentially with an ambient light filter, can allow these relatively inexpensive cameras to be used as IR detectors.

As discussed, a single wavelength of infrared radiation can be used in various embodiments to capture eye information for a user. In other embodiments, at least two different wavelengths are used to capture image information in order to get more information about the user, as well as to make it harder to fool the recognition process. In one embodiment, a single detector is used to detect radiation reflected at two different wavelengths. As an example, a first LED could emit radiation at a wavelength (e.g., 940 nm) that is reflected by the retina, and a second LED could emit radiation at a wavelength (e.g., 1100 nm) that is absorbed by the cornea and/or other portions of the human eye. Specific wavelengths can be selected within selected wavelength ranges, based at least in part upon their reflective properties with respect to the human eye. For example, experiments indicate that light has less than a 50% absorption rate (for the typical human eye) under about 940 nm, above 50% absorption between about 940 nm and about 1030 nm, around 50% absorption for wavelengths between about 1040 nm and about 1100 nm, and about 100% absorption at 1150 nm and above. Thus, emitters can be selected that fall within at least some of these ranges, such as a first IR emitter that has significantly less that 50% absorption and a second IR emitter that has significantly greater than 50% absorption. The specific wavelengths can further be based, in at least some embodiments, upon the wavelengths of available devices. For example, an available laser diode at 904 nm can be selected that has a relatively low absorption rate, and an available laser diode at 980 nm or 1064 nm can be selected that has a relatively high absorption rate. In some embodiments, the power output of the higher wavelength diode can be scaled up to substantially match the perceived brightness of the lower wavelength diode by a CMOS sensor (or other such detector), the sensitivity of which might fall off to around zero at a value of about 1100 nm, such that in at least one embodiment the two emitters have wavelengths of 910 nm and 970 nm).

An advantage to using two wavelengths is that the LEDs can emit the radiation simultaneously, as long as a resulting image is able to be decomposed in order to extract image information corresponding to each wavelength. Various approaches for decomposing such an image are discussed elsewhere herein. The LEDs then could both be positioned near the camera, or a single LED or emitter can be used near the camera if that LED operates at (at least) the two frequencies of interest.

When performing iris recognition, for example, a device might utilize IR in the 750 nm-950 nm range in order to avoid light reflections from the cornea, which can potentially create noise in the captured image information. A second wavelength might be used to determine relative absorption to ensure the image information corresponds to a human eye, as discussed above. In one example, the eye location of a user can be located using any appropriate process, such as those discussed above with respect to FIGS. 4A-4F. The ability to locate the eye region enables the more complex iris recognition processing to be performed on a smaller data set, thus reducing the amount of resources needed and producing faster results.

Figure 5:
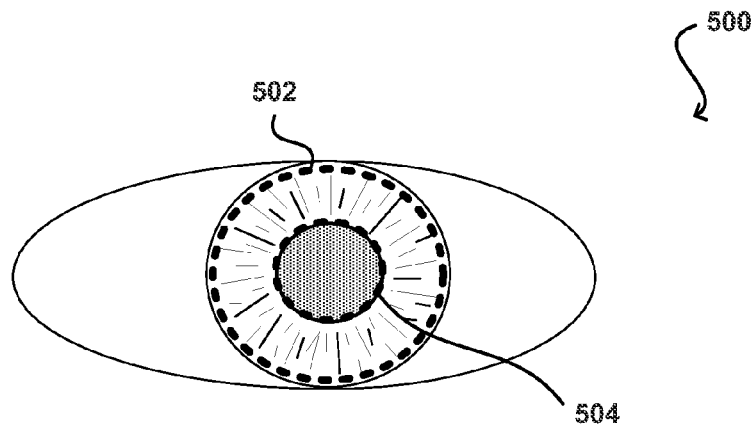
FIG. 5 illustrates an example of information captured for a human eye, where the basic shape of the eye is utilized to locate an approximate outer boundary and inner boundary of the eye, in accordance with various embodiments.

In one example process, the captured image information is analyzed to locate the region of interest, in this example the iris region of the user. FIG. 5 illustrates an example of information captured for a human eye 500, where the basic shape of the eye is utilized to locate an approximate outer boundary 502 and inner boundary 504 of the eye. In some embodiments this will be done for only one of the user's eyes, to reduce processing requirements and increase the recognition speed, while in other embodiments both eyes might be analyzed for improved accuracy, as may be needed for more secure applications. In some embodiments, the information captured for a second eye will only be analyzed if the results for the first eye are inconclusive or if there is a problem with the analysis of the first eye, etc. Various algorithms or settings can be used to determine which eye to analyze, such as may be based upon lighting, relative angle, etc.

Figure 6A:
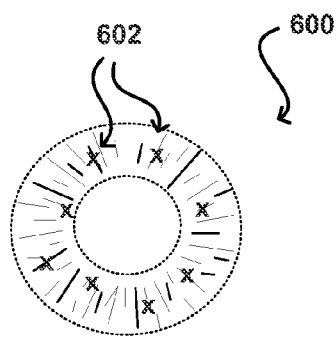
FIGS. 6A-6B illustrate examples of determining iris information of the user's eye, in accordance with various embodiments.
Figure 6B:
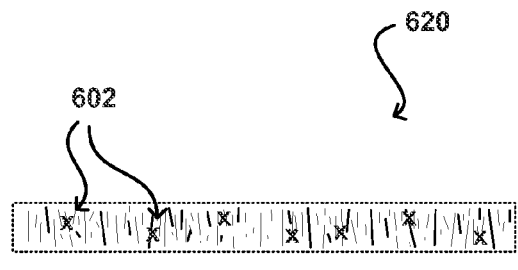

Once the portion of the image corresponding to the iris is identified, a matching or feature location process can be used to attempt to identify the user. In FIG. 6A, for example, unique or distinctive features 602 of the iris can be determined using any appropriate biometric feature determination process known or used for such purposes. In other processes, an image matching process might be used to instead attempt to identify the user, but such image matching can be relatively processor and/or memory intensive such that it can be desirable for certain devices, such as portable devices, to instead attempt to identify unique features, which then instead enables the device to match based upon a relatively small set of data points. FIG. 6B illustrates another example of iris information 620 wherein the iris information is adjusted to a substantially linear set of feature points, which can simplify the matching in at least some embodiments while still providing acceptably reliable results.

In some embodiments, the electronic device can store matching information for each user of that device, such that the matching and/or authentication process can be performed on the device. In other embodiments, the image and/or feature information can be sent to a remote location, such as a remote system or service, for processing.

Figure 7:
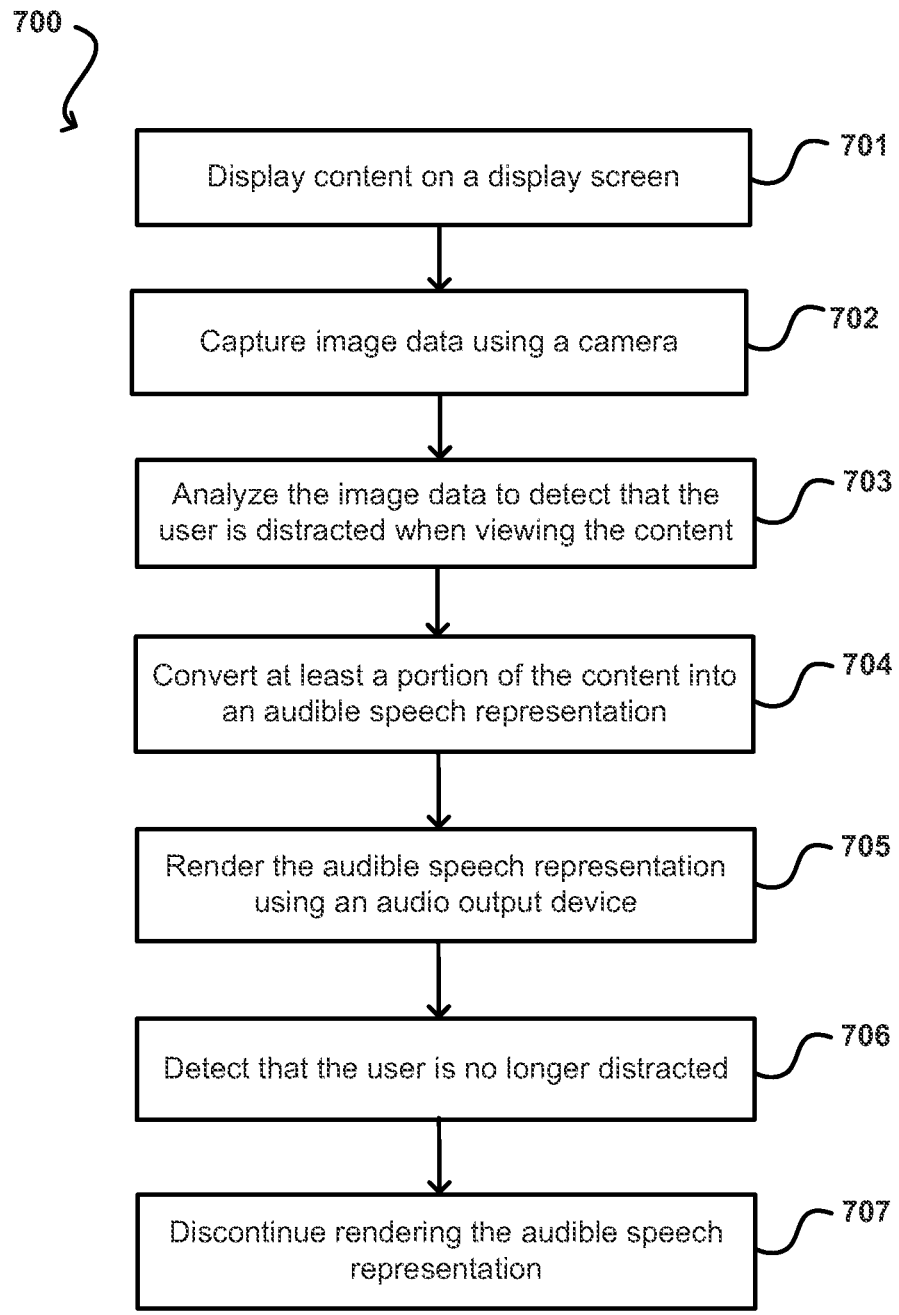
FIG. 7 illustrates an example of a process for detecting when the user is likely to be distracted and rendering an audible version of the content, in accordance with various embodiments.

FIG. 7 illustrates an example of a process 700 for detecting when the user is likely to be distracted and rendering an audible version of the content, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 701, the computing device display content on the display screen. For example, a web browser operating on the computing device may cause a web page to be displayed on the display screen of the device. Similarly, a book reader application may cause the text of a book to be displayed on the screen. In operation 702, a camera of the computing device is used to capture image data. The image data may contain a representation of one or more features of a user, such as the user's face and eyes. In operation 703, the computing device analyzes the image data to determine that the image data is indicative of the user being distracted in viewing the content displayed on the display screen. For example, based on tracking the pupils of the user, the computing device may determine that over a measured time interval, the user has gazed away from the display screen for more than a threshold amount of time or a threshold number of times. Based on this information, the computing device may determine that the user is likely to be distracted or is otherwise viewing the content with a sufficient level of irregularity.

In operation 704, the computing device converts the content displayed on the screen into an audible speech representation of the content. For example, the computing device may perform data scraping of the contents of a web page displayed on a web browser to select portions of the content that are intended to be for display to the user and convert the selected portions of the content into the audible speech representation. Alternatively, if an audio version of the content is available, the computing device may retrieve the audio version (e.g., file) from memory. Once the computing device has obtained the audible representation of the content (e.g., speech version of the text), the computing device may begin rendering the audible speech representation of the content using the audio output device, as shown in operation 705.

In operation 706, the computing device may detect that the image data is no longer indicative of the user being distracted in viewing the content displayed on the display screen. For example, the computing device may detect (based on the image data) that the user's pupils have been viewing the content on the display screen for a minimum amount of time. In operation 707, the computing device may discontinue presenting the audible speech representation using the audio output device in response to detecting that the user is no longer distracted.

Figure 8:
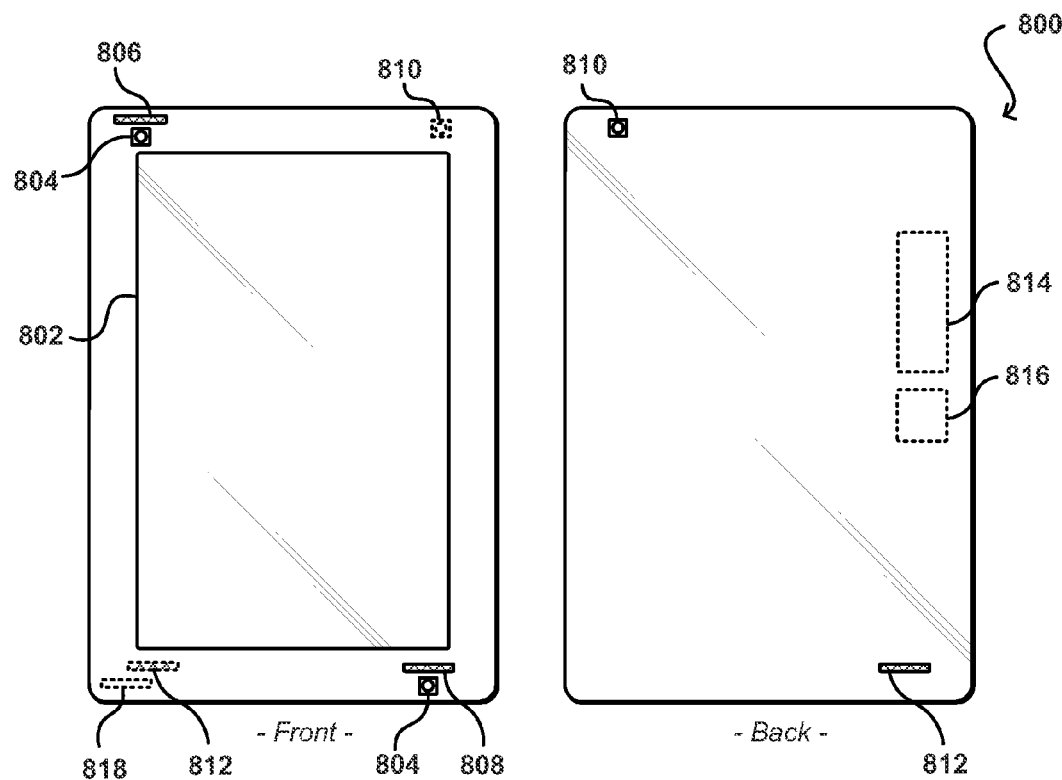
FIG. 8 illustrates front and back views of an example portable computing device that can be used in accordance with various embodiments.

FIG. 8 illustrates front and back views of an example client computing device 800 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others. The client device may have an associated browser width, browser height, as well as various other client-side information associated therewith.

In this example, the portable computing device 800 has a display screen 802 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 810 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 804 on the "front" of the device and one image capture element 810 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 806 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 800 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 814, such as may include at least one wired or wireless component operable to communicate with one or more portable computing devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
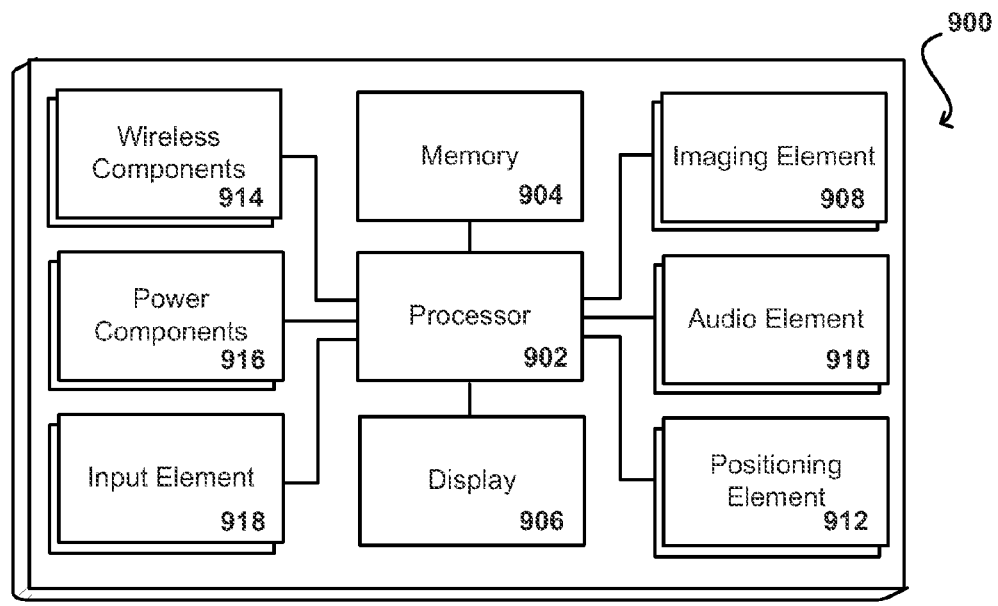
FIG. 9 illustrates an example set of basic components of a portable computing device, such as the device described with respect to FIG. 8.

In order to provide functionality such as that described with respect to FIG. 8, FIG. 9 illustrates an example set of basic components of a portable computing device 900, such as the device 800 described with respect to FIG. 8. In this example, the device includes at least one processor 902 for executing instructions that can be stored in at least one memory device or element 904. As would be apparent to one of ordinary skill in the art, the device can include many types of memory, data storage or computer-readable storage media, such as a first data storage for program instructions for execution by the processor 902, the same or separate storage can be used for images or data, a removable storage memory can be available for sharing information with other devices, etc.

The device typically will include some type of display element 906, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 908, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device.

The device, in many embodiments, will include at least one audio element 910, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 912 that provides information such as a position, direction, motion, or orientation of the device. This positioning element 912 can include, for example, accelerometers, inertial sensors, electronic gyroscopes, electronic compasses, and GPS elements.

The device can include at least one additional input device 918 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 914 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 916 known in the art for providing power to a portable computing device, which can include capacitive charging elements for use with a power pad or similar device as discussed elsewhere herein. The example device also can include at least one touch and/or pressure sensitive element 918, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

Figure 10:
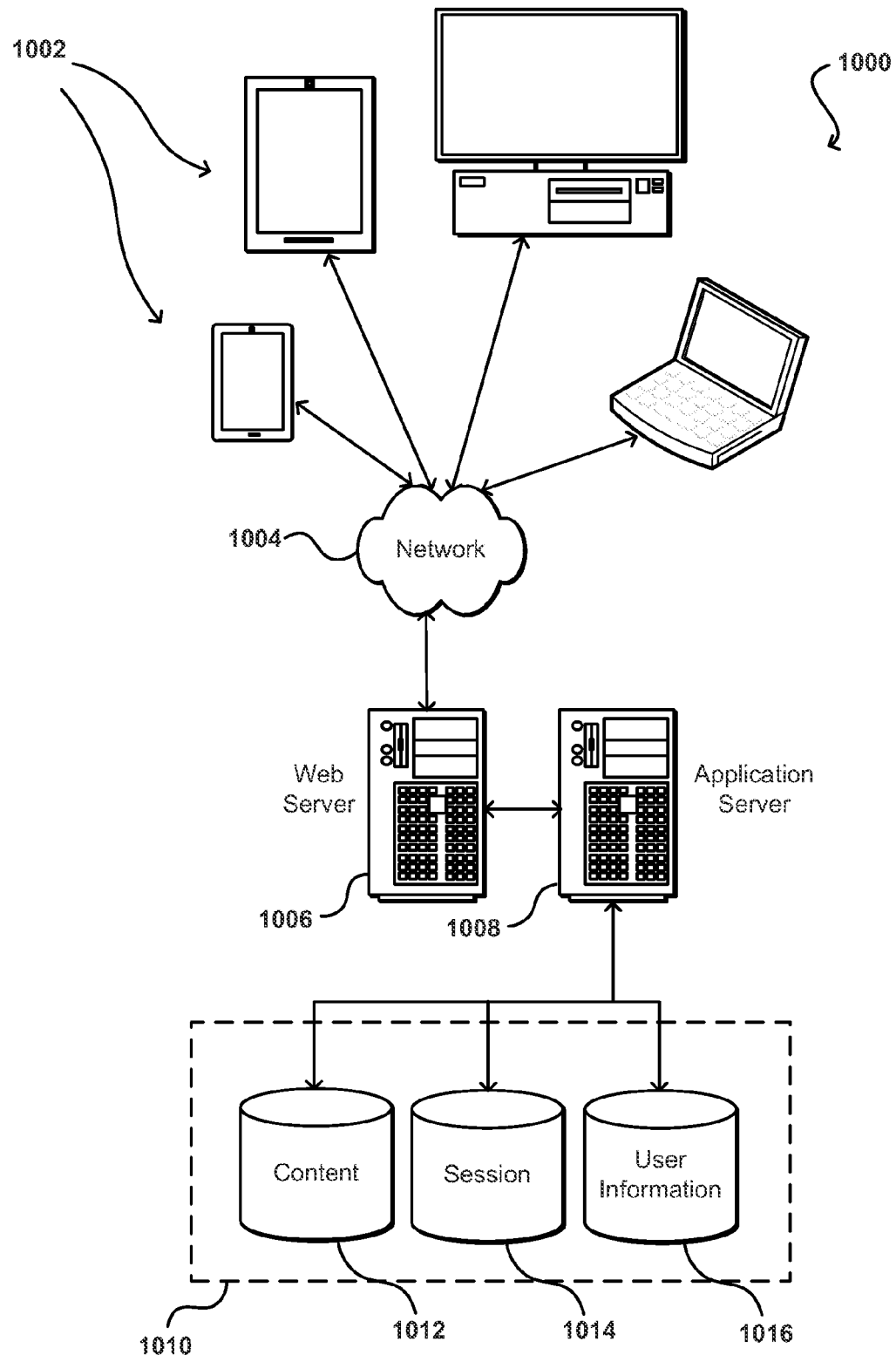
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a camera;
   a display screen;
   an audio output device;
   at least one processor; and
   memory including instructions that, when executed by the at least one processor, cause the computing device to:
      display content on the display screen;
      capture image data using the camera, the image data containing a representation of one or more features of a user;
      analyze the image data to determine that the image data is indicative of the user being distracted in viewing the content displayed on the display screen;
      convert the content displayed on the screen into an audible speech representation of the content;
      begin rendering the audible speech representation of the content using the audio output device;
      detect that the image data is no longer indicative of the user being distracted in viewing the content displayed on the display screen; and
      discontinue presenting the audible speech representation using the audio output device.

2. The computing device of claim 1, wherein analyzing the image data further comprises:
   tracking pupils of the user over a period of time to detect that the user is looking away from the display screen for at least one of: a threshold number of times over the period of time or a threshold length of time.

3. The computing device of claim 1, wherein analyzing the image data further comprises:
   tracking a head movement of the user over a period of time.

4. The computing device of claim 1, wherein the memory further comprises instructions that, when executed by the at least one processor, cause the computing device to:
   activate one or more voice commands to enable the user to navigate the content.

5. The computing device of claim 1, wherein converting the content displayed on the screen into an audible speech representation further comprising:
   data scraping contents of a web page displayed on a web browser to select portions of the content that are intended to be for display to the user; and
   converting the selected portions of the content into the audible speech representation.

6. A computer implemented method, comprising:
   under the control of one or more computer systems configured with executable instructions,
      processing sensor data captured by one or more sensors of a computing device, the computing device including a display screen for displaying content;
      analyzing the sensor data to determine that the sensor data is indicative of a user viewing the content with a sufficient level of irregularity; and
      presenting an audible representation of the content using an audio output device in response to the sensor data being indicative of the user viewing the content with the sufficient level of irregularity.

7. The computer implemented method of claim 6, further comprising:
   detecting that the sensor data is no longer indicative of the user viewing the content with the sufficient level of irregularity; and
   discontinuing the presentation of the audible representation of the content using the audio output device.

8. The computer implemented method of claim 6, further comprising:
   scrolling the content being displayed on the display screen according to the rendering of the audible representation of the content.

9. The computer implemented method of claim 6, wherein the sensor data further comprises at least one of:
  image data captured by a camera;
  location data determined by global positioning system (GPS) receiver;
  light data captured by a light sensor;
  orientation data captured by a gyroscope; or
  acceleration data captured by an accelerometer.

10. The computer implemented method of claim 6, wherein presenting an audible representation of the content further comprises one of:
  data scraping contents of a web page displayed on a web browser to select portions of the content that are intended to be for display to the user and converting the selected portions of the content into the audible speech representation; or
  retrieving an audio file associated with the content and rendering the audio file using the audio output device.

11. The computer implemented method of claim 9, wherein the content is a webpage and wherein the audio file is provided by an owner of the webpage.

12. The computer implemented method of claim 9, wherein the audio file is generated by a backend service executed by one or more servers connected to the computing device over a network connection, and wherein the one or more servers stream the audio file to the computing device.

13. The computer implemented method of claim 6, further comprising:
  detecting one or more voice commands of the user during the presentation of the audible representation of the content; and
  suspending the presentation of the audible content.

14. The computer implemented method of claim 13, further comprising:
  invoking one or more functions for navigating the content in response to the one or more voice commands.

15. The computer implemented method of claim 6, wherein analyzing the sensor data further comprises:
  tracking pupils of the user over a period of time to detect that the user is looking away from the display screen for at least one of: a threshold number of times over the period of time or a threshold length of time, the tracking of the pupils performed based at least in part on image data captured by a camera of the computing device.

16. The computer implemented method of claim 6, wherein analyzing the sensor data further comprises:
  tracking a head movement of the user over a period of time based at least in part on image data captured by a camera of the computing device.

17. A non-transitory computer readable storage medium storing one or more sequences of instructions that, when executed by one or more processors, cause a computing system to:
  process sensor data captured by one or more sensors of a computing device, the computing device including a display screen for displaying content;
  analyze the sensor data to determine that the sensor data is indicative of a user viewing the content with a sufficient level of irregularity; and
  present an audible representation of the content using an audio output device in response to the sensor data being indicative of the user viewing the content with the sufficient level of irregularity.

18. The non-transitory computer readable storage medium of claim 17, further comprising instructions that, when executed by the one or more processors, cause the computing system to:
  detect that the sensor data is no longer indicative of the user viewing the content with the sufficient level of irregularity; and
  discontinue the presentation of the audible representation of the content using the audio output device.

19. The non-transitory computer readable storage medium of claim 17, wherein the sensor data further comprises at least one of:
  image data captured by a camera;
  location data determined by global positioning system (GPS) receiver;
  light data captured by a light sensor;
  orientation data captured by a gyroscope; or
  acceleration data captured by an accelerometer.

20. The non-transitory computer readable storage medium of claim 17, wherein presenting an audible representation of the content further comprises one of:
  data scraping contents of a web page displayed on a web browser to select portions of the content that are intended to be for display to the user and converting the selected portions of the content into the audible speech representation; or
  retrieving an audio file associated with the content and rendering the audio file using the audio output device.

21. The non-transitory computer readable storage medium of claim 17, further comprising instructions that, when executed by the one or more processors, cause the computing system to:
  detect one or more voice commands of the user during the presentation of the audible representation of the content; and
  suspend the presentation of the audible content.

22. The non-transitory computer readable storage medium of claim 21, further comprising instructions that, when executed by the one or more processors, cause the computing system to:
  invoke one or more functions for navigating the content in response to the one or more voice commands.

23. The non-transitory computer readable storage medium of claim 17, wherein analyzing the sensor data further comprises:
  tracking pupils of the user over a period of time to detect that the user is looking away from the display screen for at least one of: a threshold number of times over the period of time or a threshold length of time, the tracking of the pupils performed based at least in part on image data captured by a camera of the computing device.

* * * * *